United States Patent
Putnam

(10) Patent No.: US 7,640,751 B2
(45) Date of Patent: Jan. 5, 2010

(54) FUEL HEATING SYSTEM FOR TURBINE ENGINES

(75) Inventor: Robert A. Putnam, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 762 days.

(21) Appl. No.: 11/440,821

(22) Filed: May 25, 2006

(65) Prior Publication Data
US 2007/0271928 A1   Nov. 29, 2007

(51) Int. Cl.
*F02C 7/08* (2006.01)
(52) U.S. Cl. .......................................... 60/736; 60/39.5
(58) Field of Classification Search ................ 60/736, 60/39.5, 39.52, 39.511
See application file for complete search history.

(56) References Cited

U.S. PATENT DOCUMENTS

| | | | |
|---|---|---|---|
| 2,914,917 A * | 12/1959 | Van Nest ..................... | 60/785 |
| 3,049,878 A | 8/1962 | Goodall et al. | |
| 3,300,965 A | 1/1967 | Sherlaw et al. | |
| 3,895,492 A | 7/1975 | Forster et al. | |
| 4,075,831 A | 2/1978 | McGann | |
| 4,085,579 A | 4/1978 | Holzapfel et al. | |
| 4,354,345 A | 10/1982 | Dreisbach, Jr. et al. | |
| 4,406,128 A | 9/1983 | Fanaritis et al. | |
| 5,581,997 A * | 12/1996 | Janes ........................ | 60/39.12 |
| 5,794,448 A | 8/1998 | Fujioka et al. | |
| 5,802,841 A | 9/1998 | Maeda | |
| 6,253,554 B1 | 7/2001 | Kobayashi et al. | |
| 6,385,960 B1 | 5/2002 | Kress et al. | |
| 6,584,778 B1 | 7/2003 | Griffiths et al. | |
| 6,598,400 B2 | 7/2003 | Nash et al. | |
| 6,711,889 B2 | 3/2004 | Kuo et al. | |
| 2005/0120715 A1 | 6/2005 | Labrador | |

* cited by examiner

*Primary Examiner*—Michael Cuff
*Assistant Examiner*—Andrew Nguyen

(57) ABSTRACT

A fuel heating system for fuel usable in a turbine engine. The fuel heating system may include at least one fuel heating chamber in communication with an exhaust stack of a turbine engine. The fuel heating chamber may be configured to allow exhaust gases to flow through the at least one fuel heating chamber. The fuel heating system may also include at least one conduit positioned in the fuel heating chamber. The conduit may be configured to receive fuel from a fuel source at a first temperature, allow the fuel to flow through the conduit, and exhaust the fuel at a second temperature that is higher than the first temperature.

9 Claims, 3 Drawing Sheets

FUEL HEATING SYSTEM FOR TURBINE ENGINES

FIELD OF THE INVENTION

This invention is directed generally to turbine engines, and more particularly to fuel systems of turbine engines.

BACKGROUND

It is known that in thermal power turbine engines, complete combustion of fuel is desired. In addition, it has further been determined that the efficiency of a turbine engine may be increased by heating fuel before the fuel is ignited in a turbine engine. Numerous heating systems have been created to heat fuel before ignition. However, many of these conventional heating systems place a load on the turbine engines to which they are attached, thereby decreasing the efficiency of the turbine engines. Thus, a need exists for an efficient fuel heating system for turbine engines.

SUMMARY OF THE INVENTION

This invention is directed to a fuel heating system for a turbine engine. The fuel heating system may be configured to increase the temperature of fuel usable in a turbine engine by using heat in exhaust gases of the turbine engine. In particular, the fuel heating system may be formed from one or more fuel heating chambers in communication with an exhaust stack of a turbine engine. The fuel heating system may be configured to allow exhaust gases to flow through the fuel heating chamber to heat the fuel. The fuel heating system may also include one or more conduits positioned in the fuel heating chamber. The conduit may be configured to receive fuel from one or more fuel sources, such as a fuel tank, at a first temperature, allow the fuel to flow through the conduit, and exhaust the fuel at a second temperature that is higher than the first temperature.

The fuel heating system may include one or more plates for controlling the flow of exhaust gases into the fuel heating chamber. In at least one embodiment, two plates may be used and include one or more orifices. The orifices may be aligned to enable exhaust gases to flow through the plate. The plates may be moved relative to each other to reduce or increase the size of the openings created by the two plates overlapping the exhaust gas orifices.

The fuel heating system may also include a method of increasing the temperature of fuel for a turbine engine. During use, fuel may be passed into the conduit at a first temperature. The fuel may receive heat from exhaust gases flowing through the fuel heating chamber and may be expelled from the conduit at a second temperature that is higher than the first temperature. In particular, exhaust gases may flow into the fuel heating chamber through the exhaust gas orifices in the plates or through the inlets, depending on which embodiment of the fuel heating system is used. The plates may be used to control the flow of exhaust gases into the fuel heating chamber by sliding one plate relative to the other plate, to control the effective opening of the orifices. The exhaust gas flowing through the fuel heating chamber may also be controlled with dampers. In at least one embodiment, the fuel heating system may be capable of heating the fuel to a temperature of about 550 degrees Fahrenheit using an exhaust gas temperature of about 1,100 degrees Fahrenheit. The exhaust gas in the fuel heating chamber may be returned to the exhaust stack through outlets or through the orifices in the plates.

An advantage of this invention is that fuel heating may be accomplished with exhaust gases without the need to reduce the velocity of exhaust gas flow. Instead, the exhaust gases may be passed through the fuel heating chamber directly from the exhaust stack.

Another advantage of this invention is that direct flow through of exhaust gases is not required to heat fuel in the system. Rather, fuel may be heated to about 550 degrees Fahrenheit with exhaust gases of about 1,100 degrees Fahrenheit using an open valve system in which exhaust gases may flow into and out of the fuel heating chamber through exhaust gas orifices in the plates.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
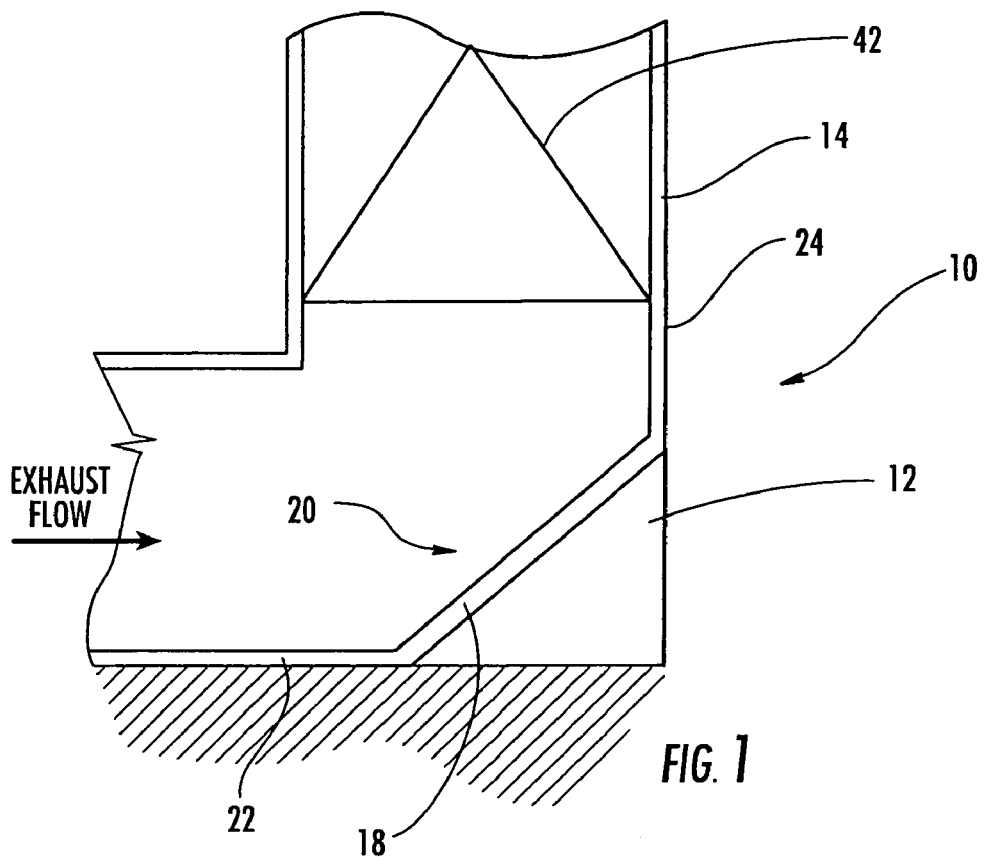
FIG. 1 is a cross-sectional side view of an exhaust stack in an exhaust system of a turbine engine including an inclined plate forming a cavity utilized by at least one embodiment of the invention.

As shown in FIGS. 1-5, the invention is directed to a fuel heating system 10 for a turbine engine. The fuel heating system 10 may be configured to increase the temperature of fuel usable in a turbine engine by using heat found in exhaust gases of the turbine engine. In particular, the fuel heating system 10 may be formed from one or more fuel heating chambers 12 in communication with an exhaust stack 14 of a turbine engine. The fuel heating system 10 may be configured to allow exhaust gases to flow through the fuel heating chamber 12 to heat the fuel. The fuel heating system 10 may also include one or more conduits 16 positioned in the fuel heating chamber 12. The conduit 16 may be configured to receive fuel from one or more fuel sources, such as, but not limited to, a fuel tank, at a first temperature, allow the fuel to flow through the conduit 16, and exhaust the fuel at a second temperature that is higher than the first temperature.

Figure 2:
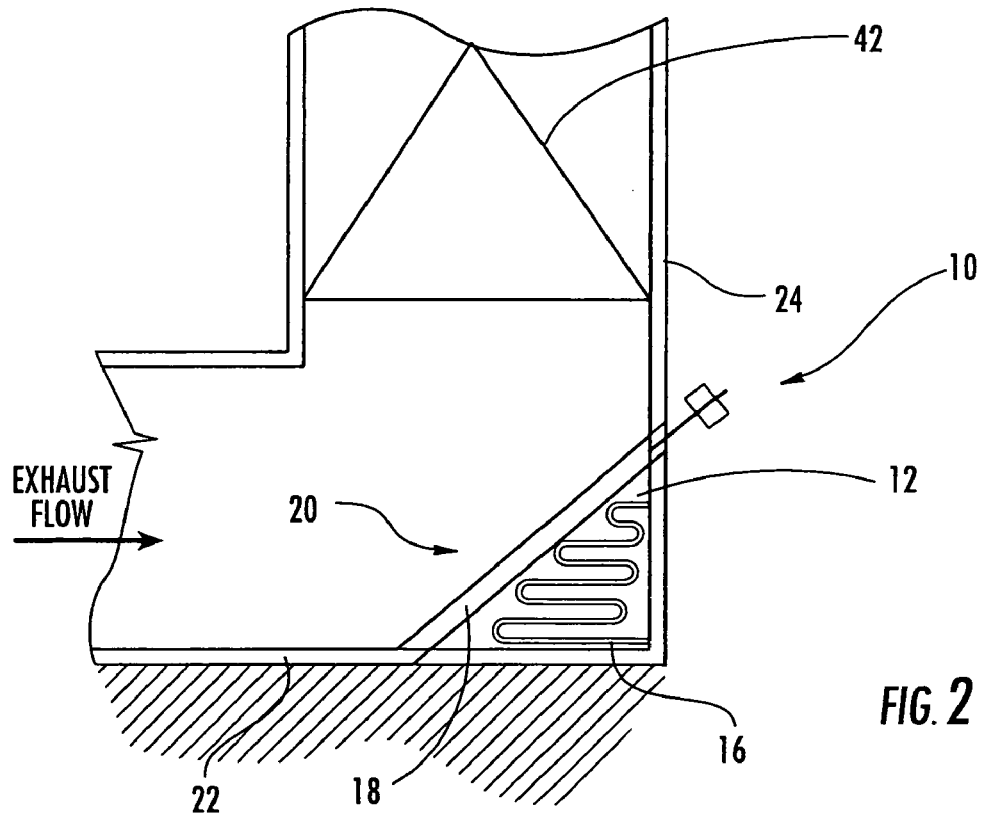
FIG. 2 is another cross-sectional side view of an exhaust stack in an exhaust system of a turbine engine including aspects of the invention.
Figure 3:
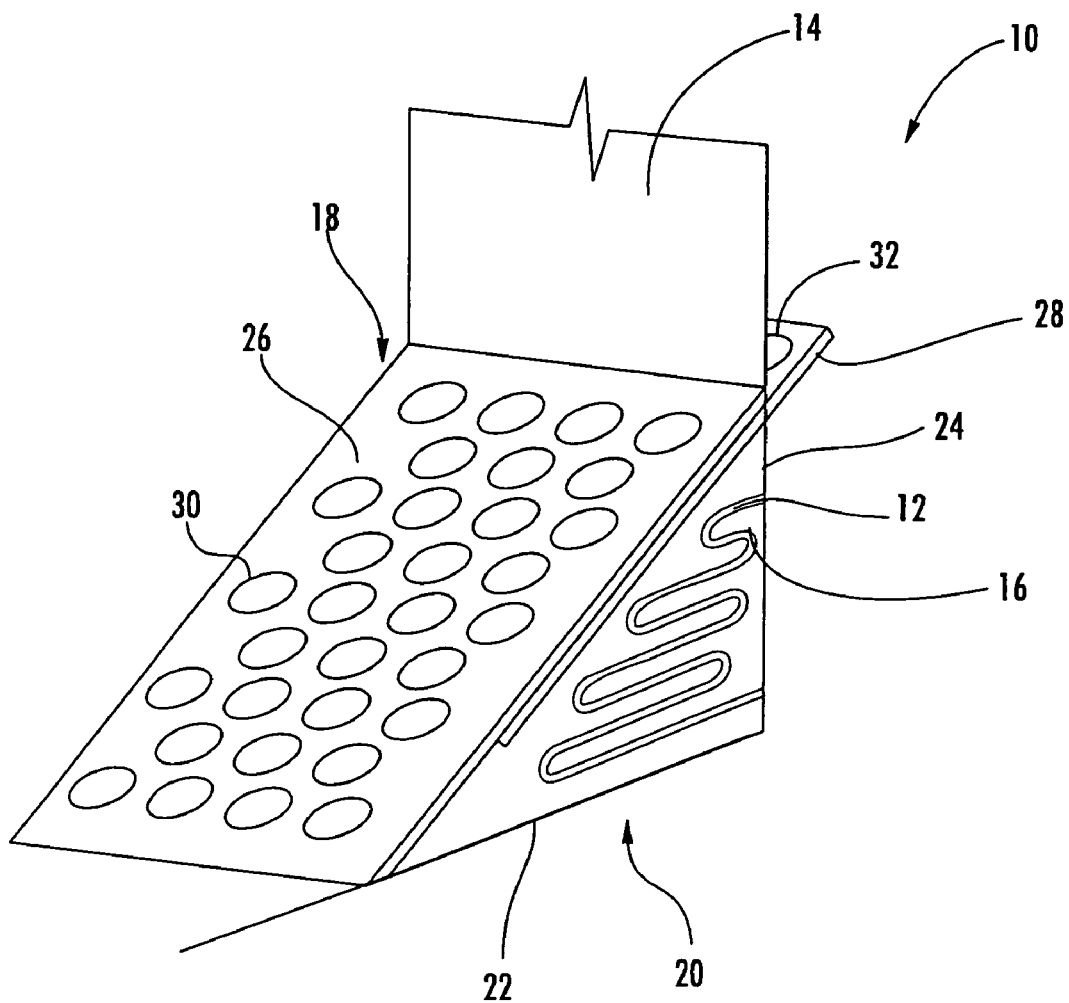
FIG. 3 is a partial perspective view of the fuel heating system positioned in an exhaust stack.

As shown in FIGS. 1-3, the fuel heating system 10 may be positioned inside an exhaust stack 14 of a turbine engine. The fuel heating chamber 12 may include one or more exhaust flow control structures 18 configured to control the exhaust flow in the exhaust stack 14. The exhaust flow control structures 18 may be any structure capable of controlling the exhaust flow in the exhaust stack 14. In one embodiment, the exhaust flow control structure 18 may be formed from plates 18 usable to define the fuel heating chamber. As shown in FIG. 3, the fuel heating chamber may be formed from a plate 18 positioned in a corner 20 of the exhausts stack. The plate 18 may be coupled to a first wall 22 and coupled to a second wall 24 that is generally orthogonal to the first wall 22. However, the first and second walls 22, 24 need not be orthogonal to each other. In other embodiments, the first and second walls 22 may be positioned in other nonparallel positions relative to each other. In one embodiment, the plate 18 may be formed from an outer plate 26 positioned over an inner plate 28. The outer plate 26 may include one or more exhaust gas orifices 30, and the inner plate 28 may include one or more exhaust gas orifices 32. The exhaust gas orifices 30, 32 may be positioned on the outer and inner plates 26, 28, respectively, so that the orifices 30, 32 may be aligned. The plates 26, 28 may be moved generally along the major plane of the plates 26, 28 relative to each other to change the size of the opening through the orifices 30, 32. The plates 26,28 may be moved to a position in which no portions of the orifices 30, 32 are aligned, thereby sealing the fuel heating chamber 12 and preventing exhaust gases from flowing through the fuel heating chamber 12.

In at least one embodiment, as shown in FIG. 3, the inner and outer plates 28, 26 may include a plurality of exhaust gas orifices 32, 30 in each plate 38, 26. In one embodiment, the exhaust orifices 30, 32 may be positioned such that all of the orifices 30 of the outer plate 26 may be aligned with all of the orifices 32 of the inner plate 28. In addition, the outer plate 26 may be moved relative to the inner plate 28 such that all of the orifices 32 of the inner plate 28 are covered by the outer plate 26. In another embodiment, the orifices 32 in the inner plate 28 may be positioned such that some, but not all of the orifices 32 are aligned with orifices 30 of the outer plate 26. The orifices 30, 32 may have any appropriate size. Movement of the outer plate 26 relative to the inner plate 28, or vice versa, may be remotely controlled through the use of an actuator system.

As shown in FIGS. 2 and 3, the conduit 16 carrying the fuel may be positioned in the fuel heating chamber 12. In at least one embodiment, the conduit 16 may be formed from a serpentine shaped conduit 16. In other embodiments, the conduit 16 may have other shapes. The conduit 16 may be formed from highly conductive materials, such as, but not limited to, carbon steel pipe, with or without additional fins to facilitate heat transfer. The conduit 16 may have any cross-sectional area sufficient to pass a fuel through the conduit 16 at a desired flow rate.

Figure 4:
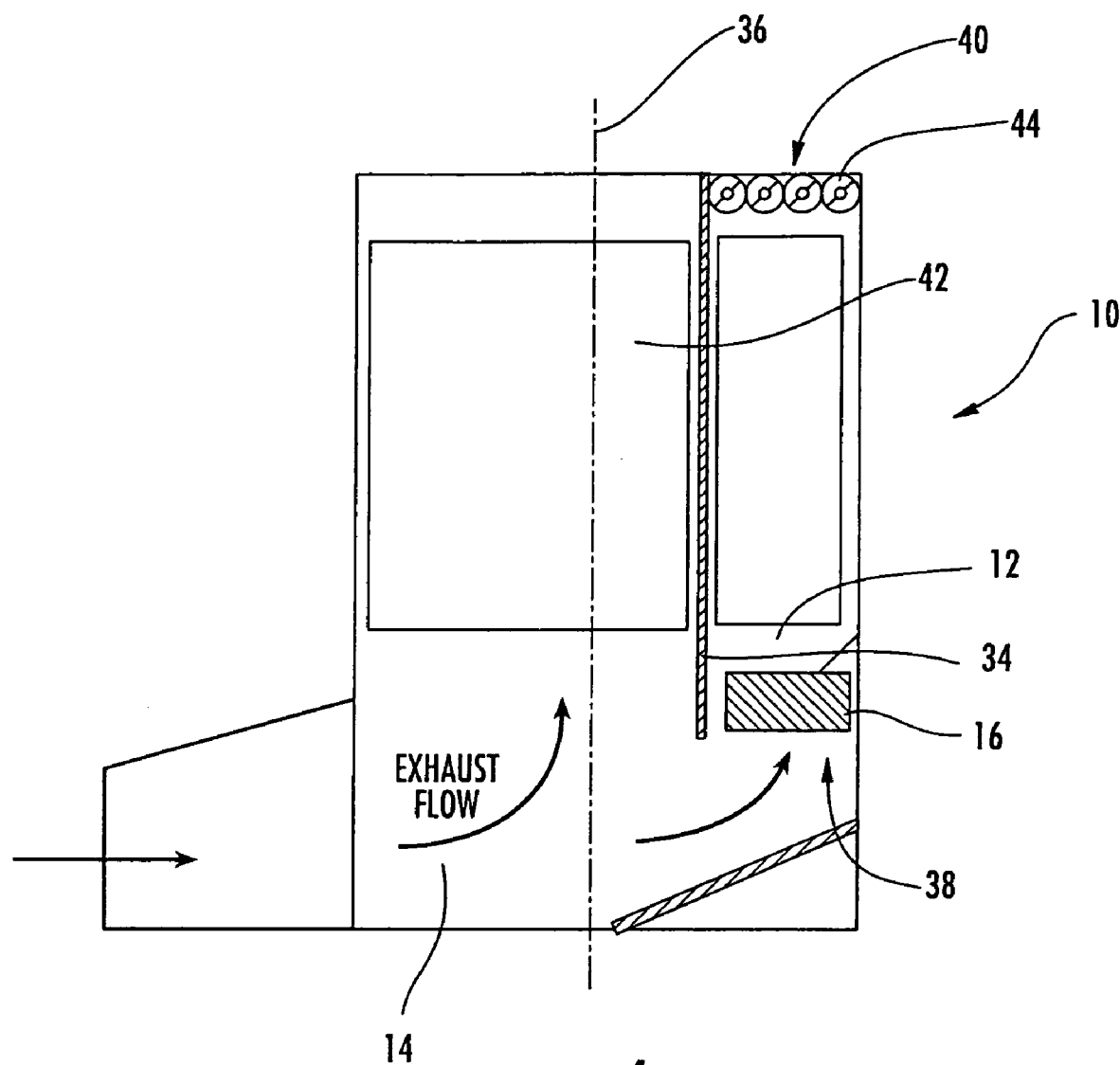
FIG. 4 is a cross-sectional view of an alternative fuel heating system in an exhaust stack of a turbine engine.

In another embodiment, as shown in FIG. 4, the fuel heating system 10 may be placed in the exhaust stack 14 of the turbine engine. In particular, the fuel heating chamber 12 may be formed from a baffle 34 positioned in the exhaust stack 14. The baffle 34 may be aligned generally with a longitudinal axis 36 of the exhaust stack 14. The baffle 34 may form an inlet 38 and an outlet 40 for the fuel heating chamber 12. A conduit 16 may be positioned in the fuel heating chamber 12 downstream from the inlet 38 and upstream from the outlet 40. The conduit 16 may be configured as previously set forth.

The fuel heating system 10 may include one or more silencers 42. As shown in FIG. 4, one or more silencers 42 may be positioned in the fuel heating chamber 12. The silencers 42 may be positioned downstream from the conduit 16. The silencers 42 may also be positioned in the exhaust stack 14 proximate to the silencers 42 positioned in the fuel heating chamber 12, as shown in FIGS. 1, 2, and 4. The silencers 42 may be, but are not limited to being, an absorptive silencer, produced by Braden Corp. of Tulsa, Okla.

The fuel system 10 may include one or more dampers 44 for controlling the exhaust flow. As shown in FIG. 4, the damper 44 may be positioned downstream from the conduit 16 and downstream from the silencer 42. The damper 44 may be any suitable design capable of substantially preventing exhaust gases from passing through fuel heating chamber 12. The damper 44 may be configured to be adjustable to control the flow of exhaust flows.

Figure 5:
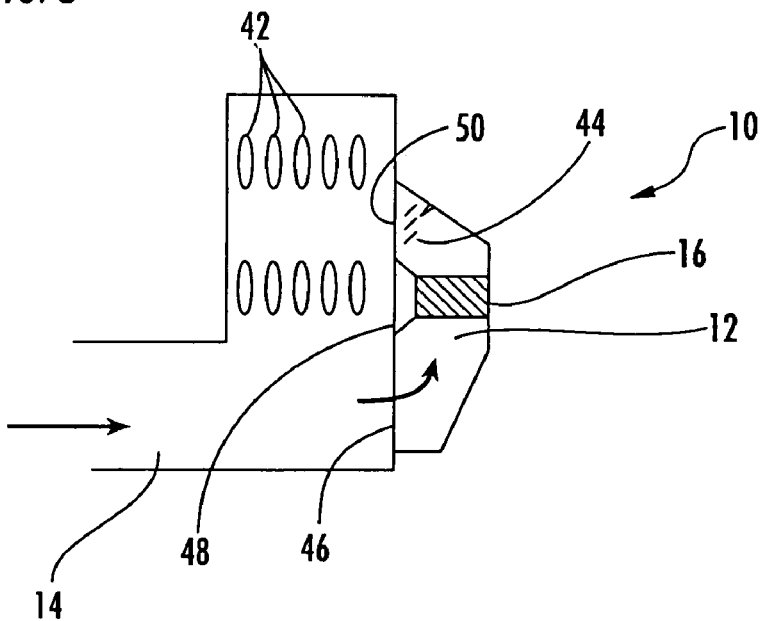
FIG. 5 is a cross-sectional view of another alternative fuel heating system in an exhaust stack of a turbine engine.

In yet another embodiment, as shown in FIG. 5, the fuel heating chamber 12 may be a self-contained chamber 12 having an inlet 46 in an outerwall 48 of the exhaust stack for receiving exhaust gases, and an outlet 50 in the outerwall 48. The fuel heating chamber 12 may include a conduit 16 that may be configured as previously set forth. In addition, the fuel heating chamber 12 may include one or more dampers 44 that may be positioned downstream or upstream from the conduit 16. One or more silencers 42 may be positioned in the exhaust stack 14 proximate to the fuel heating chamber 12. The silencer 42 may be positioned in one, two, or more rows, so as to accommodate the fuel heating chamber 12 configuration.

During use, fuel is passed into the conduit 16 at a first temperature. The fuel may receive heat from exhaust gases flowing through the fuel heating chamber 12 and may be expelled from the conduit 16 at a second temperature that is higher than the first temperature. In particular, exhaust gases may flow into the fuel heating chamber 12 through the exhaust gas orifices 30,32 in the plates 26, 28 or through the inlets 38, 46, depending on which embodiment of the fuel heating system 10 is used. The plates 26, 28 may be used to control the flow of exhaust gases into the fuel heating chamber 12 by sliding one plate 26, 28 relative to the other plate 26, 28, thereby reducing the effective opening of the orifices 30, 32. In the embodiments shown in FIGS. 4-5, the exhaust gas flowing through the fuel heating chamber 12 may be controlled with dampers 44. In at least one embodiment, the fuel heating system 10 is capable of heating the fuel to a temperature of about 550 degrees Fahrenheit using an exhaust gas temperature of about 1,100 degrees Fahrenheit. The exhaust gas in the fuel heating chamber 12 may be returned to the exhaust stack 14 through outlet 50 or may exit the exhaust stack 14 directly through outlet 40. Gases may exit the fuel heating chamber 12 through exhaust gas orifices 30, 32 as well.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A fuel heating system for a turbine engine, comprising:
at least one fuel heating chamber in communication with an exhaust stack of a turbine engine and configured to allow exhaust gases to flow through the at least one fuel heating chamber; and
at least one conduit positioned in the at least one fuel heating chamber and configured to receive fuel from at least one fuel source at a first temperature, allow the fuel to flow through the at least one conduit, and exhaust the fuel at a second temperature that is higher than the first temperature,
wherein the at least one fuel heating chamber is positioned in a corner of the exhaust stack of the turbine engine; and
wherein the at least one fuel heating chamber is formed from at least one plate attached to a first wall of the exhaust stack and attached to a second wall of the exhaust stack that is positioned nonparallel to the first wall and wherein the heating chamber is defined by the plate, the first wall, and the second wall.

2. The fuel heating system of claim 1, wherein the at least one conduit comprises a serpentine shaped metallic conduit.

3. The fuel heating system of claim 1, wherein the at least one plate comprises a first plate having at least one exhaust gas orifice positioned over a second plate having at least one exhaust gas orifice, wherein the first plate is movable relative to the second plate to adjust a cross-sectional area of the at least one exhaust gas orifice of the second plate to control flow of exhaust gases into the at least one fuel heating chamber.

4. The fuel heating system of claim 3, wherein the first plate comprises a plurality of exhaust gas orifices, and the second plate comprises a plurality of exhaust gas orifices.

5. The fuel heating system of claim 4, wherein the plurality of exhaust gas orifices in the first plate are offset laterally from the plurality of exhaust gas orifices in the second plate.

6. The fuel heating system of claim 5, wherein the plurality of exhaust gas orifices in the first plate are offset laterally from the plurality of exhaust gas orifices in the second plate such that in a first position, the plurality of exhaust gas orifices in the first plate are aligned with the plurality of exhaust gas orifices in the second plate, and in a second position, the plurality of exhaust gas orifices in the second plate are covered by the first plate.

7. The fuel heating system of claim 5, wherein the plurality of exhaust gas orifices in the first plate are offset laterally from the plurality of exhaust gas orifices in the second plate such that in a first position, a portion of the plurality of exhaust gas orifices in the first plate are aligned with the plurality of exhaust gas orifices in the second plate, and in a second position, the portion of the plurality of exhaust gas orifices in the second plate are covered by the first plate.

8. A method of heating fuel usable in a turbine engine, comprising:

passing fuel from a fuel storage location to a fuel heating system for a turbine engine, wherein the fuel heating system comprises at least one fuel heating chamber in communication with an exhaust stack of a turbine engine and configured to allow exhaust gases to flow through the at least one fuel heating chamber; and at least one conduit positioned in the at least one fuel heating chamber; receiving fuel from at least one fuel source at a first temperature; passing the fuel through the at least one conduit; and exhausting the fuel at a second temperature that is higher than the first temperature, wherein passing fuel from a fuel storage location to a fuel heating system for a turbine engine comprises passing fuel to a fuel heating system comprising at least one fuel heating chamber positioned in a corner of the exhaust stack of the turbine engine and formed from at least one plate attached to a first wall of the exhaust stack and attached to a second wall of the exhaust stack that is positioned nonparallel to the first wall, wherein the heating chamber is defined by the plate, the first wall, and the second wall; and wherein the at least one plate comprises a first plate having at least one exhaust gas orifice positioned over a second plate having at least one exhaust gas orifice, wherein the first plate is movable relative to the second plate to adjust a cross-sectional area of the at least one exhaust gas orifice of the second plate to control flow of exhaust gases into the at least one fuel heating chamber.

9. The method of claim 8, wherein passing fuel from a fuel storage location to a fuel heating system for a turbine engine comprises passing fuel to a fuel heating system, wherein the first plate comprises a plurality of exhaust gas orifices and the second plate comprises a plurality of exhaust gas orifices, wherein the plurality of exhaust gas orifices in the first plate are offset laterally from the plurality of exhaust gas orifices in the second plate such that in a first position, the plurality of exhaust gas orifices in the first plate are aligned with the plurality of exhaust gas orifices in the second plate, and in a second position, the plurality of exhaust gas orifices in the second plate are covered by the first plate.

* * * * *

UNITED STATES PATENT AND TRADEMARK OFFICE
CERTIFICATE OF CORRECTION

PATENT NO. : 7,640,751 B2 Page 1 of 1
APPLICATION NO. : 11/440821
DATED : January 5, 2010
INVENTOR(S) : Robert A. Putnam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Sixteenth Day of November, 2010

David J. Kappos
*Director of the United States Patent and Trademark Office*